(12) United States Patent
Eaton

(10) Patent No.: US 8,167,380 B2
(45) Date of Patent: May 1, 2012

(54) ADJUSTABLE WEIGHTED WHEEL ASSEMBLY

(75) Inventor: James A. Eaton, Antelope, CA (US)

(73) Assignee: Vanquish Products, LLC, Los Gatos, CA (US)

( * ) Notice: Subject to any disclaimer, the term of this patent is extended or adjusted under 35 U.S.C. 154(b) by 0 days.

(21) Appl. No.: 12/832,850

(22) Filed: Jul. 8, 2010

(65) Prior Publication Data

US 2010/0276987 A1    Nov. 4, 2010

Related U.S. Application Data

(63) Continuation of application No. 12/720,413, filed on Mar. 9, 2010, now abandoned.

(60) Provisional application No. 61/159,057, filed on Mar. 10, 2009.

(51) Int. Cl.
*B60B 25/02* (2006.01)

(52) U.S. Cl. .................. 301/53.5; 301/9.2; 301/64.203; 301/64.305; 152/381.4; 152/398

(58) Field of Classification Search .................. 301/9.2, 301/35.629, 35.63, 53.5, 64.202, 64.203, 301/64.302, 64.303, 64.305, 105.1; 152/381.4, 152/396, 397, 398, 409; 295/6, 7
See application file for complete search history.

(56) References Cited

U.S. PATENT DOCUMENTS

| | | | | |
|---|---|---|---|---|
| 1,133,355 A * | 3/1915 | Baker | ............................. | 301/52 |
| 1,239,749 A * | 9/1917 | Veltung | ......................... | 152/233 |
| 1,286,524 A * | 12/1918 | Bryan | ........................... | 152/409 |
| 1,386,164 A * | 8/1921 | Dade | ........................ | 301/64.303 |
| 1,442,603 A * | 1/1923 | Coates | ..................... | 301/64.305 |
| 1,589,915 A * | 6/1926 | Whitehead | .................... | 301/53.5 |
| 1,606,077 A * | 11/1926 | Johnson | ........................ | 301/5.1 |
| 1,765,858 A * | 6/1930 | Anderson | ........................ | 152/5 |
| 2,576,736 A * | 11/1951 | Watkins | ........................ | 152/397 |
| 2,606,075 A * | 8/1952 | Roloff | ......................... | 301/53.5 |
| 2,943,889 A * | 7/1960 | Woldring et al. | ........ | 301/64.304 |
| 3,024,830 A * | 3/1962 | Bowersox | ..................... | 152/396 |
| 4,105,254 A * | 8/1978 | Corner et al. | ............ | 301/64.305 |
| 4,693,696 A * | 9/1987 | Buck | ............................ | 446/224 |
| 4,900,095 A * | 2/1990 | Brubaker | ................. | 301/64.706 |
| 5,116,106 A * | 5/1992 | Hardesty et al. | ............. | 301/53.5 |
| 7,537,034 B2 * | 5/2009 | Zabaleta | ....................... | 152/396 |
| 2006/0079149 A1 * | 4/2006 | Proch | ........................... | 446/431 |

* cited by examiner

*Primary Examiner* — Kip T Kotter
(74) *Attorney, Agent, or Firm* — Hamilton DeSanctis & Cha LLP

(57) ABSTRACT

The application discloses a wheel assembly comprising a wheel comprising a main body, a substantially cylindrical wall, a front hub face comprising a central portion connecting a hub to an outer rim, wherein the front hub face comprises a socket for receiving a removable weight, wherein the socket or the weight is configured with a stop for preventing the weight from dislodging from the socket; a back face comprising a back central portion connecting the hub to the back outer rim; and the wheel assembly comprising at least one fastener for securing the weigh in the socket on the main body of the wheel.

5 Claims, 9 Drawing Sheets

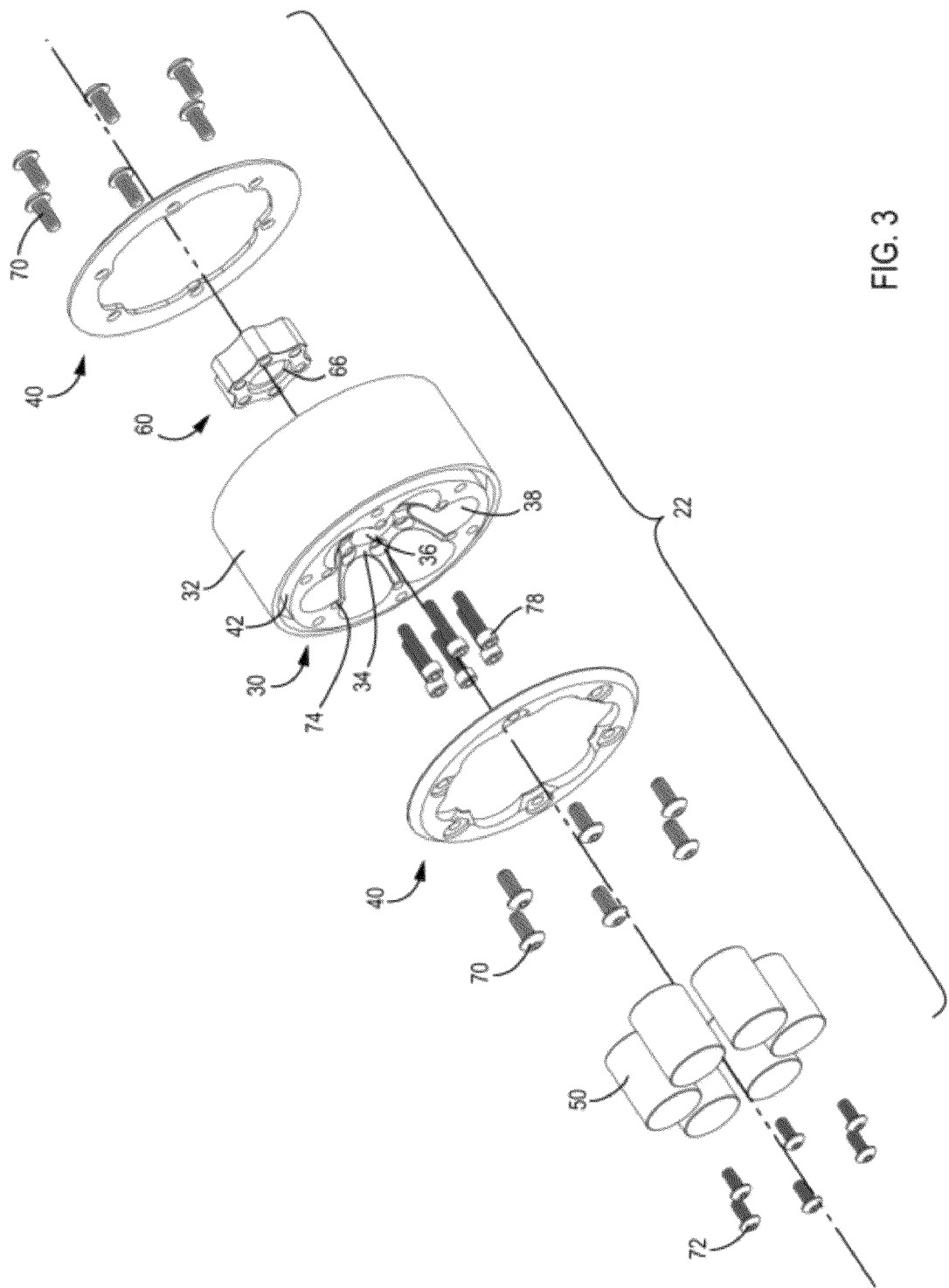

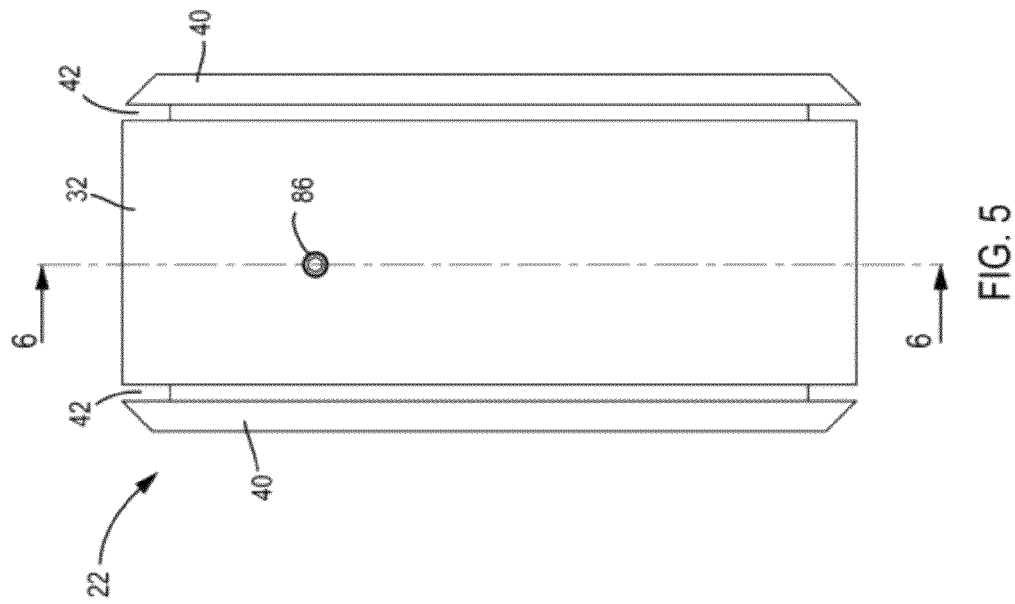
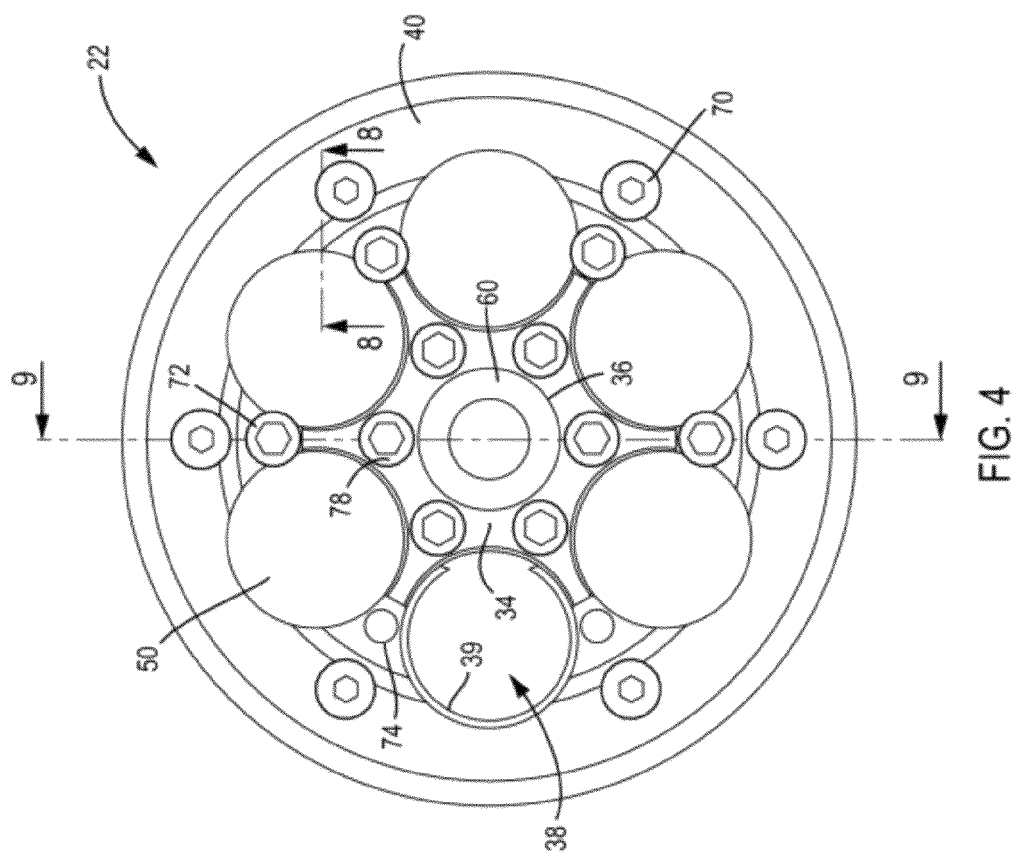

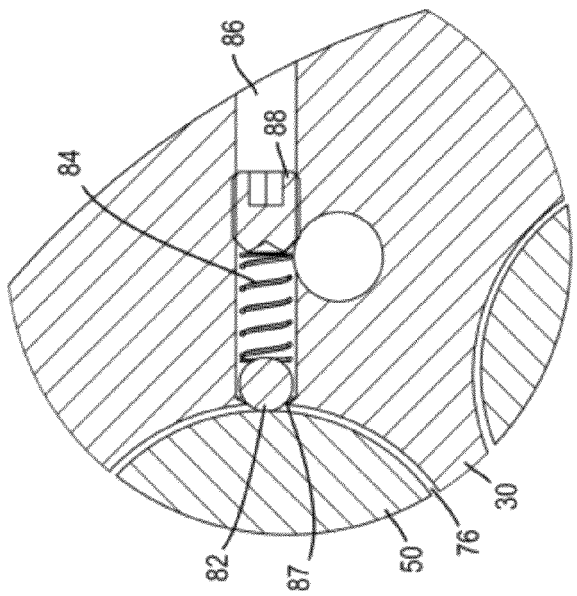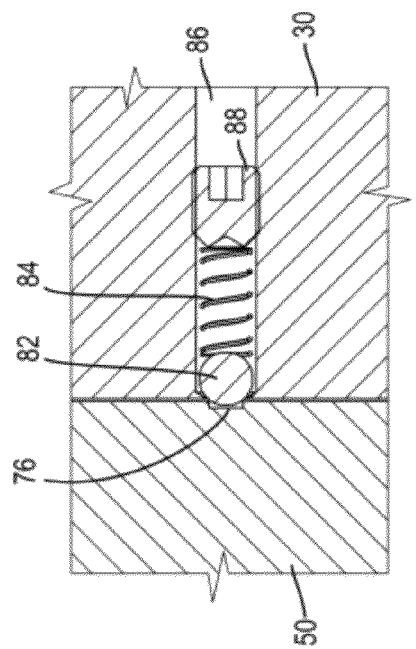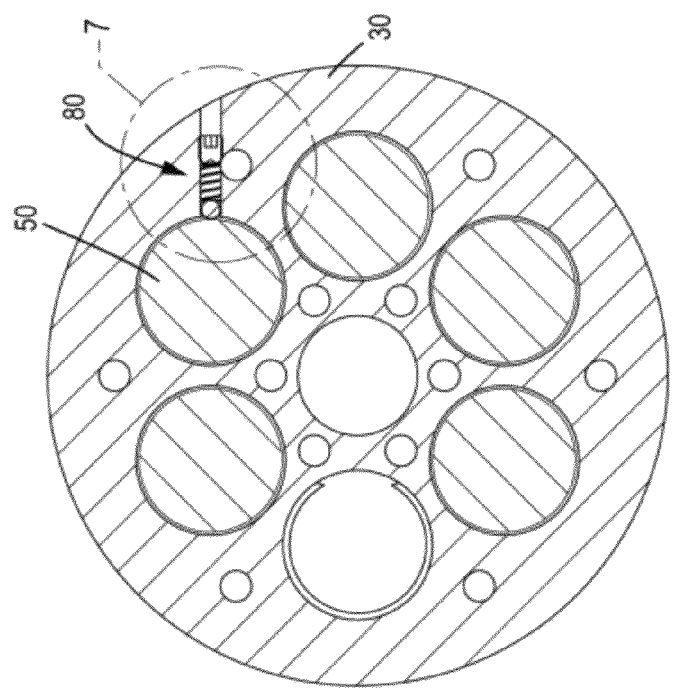

ADJUSTABLE WEIGHTED WHEEL ASSEMBLY

RELATED APPLICATION

This application is a continuation application of U.S. Ser. No. 12/720,413, filed Mar. 9, 2010, now abandoned which claims the benefit of U.S. Provisional Application No. 61/159,057, filed Mar. 10, 2009, both of which are incorporated herein by reference.

BACKGROUND OF THE INVENTION

The present disclosure relates generally to the field of weighted wheel assembly for vehicle, such as wheel assembly for radio controlled (RC) model vehicles. More specifically, the disclosure relates to adjustable and removable weights for wheels for an RC vehicle that may be used for rock crawling.

Some RC vehicles are designed for rock crawling, requiring navigation over obstacles and extremely uneven, rocky surfaces. Such vehicles are often driven up steep slopes, sometimes approaching a vertical orientation. To maintain stability and reduce the likelihood that the vehicle will tip over, rock crawling vehicles are generally designed with a low center of gravity. RC rock crawling vehicles may have their centers of gravity further lowered by weighting the wheels. Wheels for RC rock crawling vehicles are often weighted with the addition of lead weights, such as lead weights made for balancing tires or lead shot. The weights are usually attached to the outer periphery of the wheel rim, requiring the removal of the tire and any foam tire supports before the weights are added. Further, such weights are often crudely attached to the rim, such as with tape. Using such weights, therefore, represents a time consuming and involved process. Additionally, it is also difficult to change the number or types of weights, requiring the complete removal and re-taping of the weights, along with the removal of the tire.

It would be desirable to provide an improved adjustable weighted wheel assembly for RC model vehicles.

SUMMARY OF THE INVENTION

One embodiment of the present application relates to a wheel assembly comprising: a wheel comprising a main body, a substantially cylindrical wall, a front hub face and a back hub face comprising a central portion connecting a hub to an outer rim, wherein the front hub face or the back hub face comprise a socket for receiving a removable weight, wherein the socket or the weight is configured with a stop for preventing the weight from dislodging from the socket; a back hub face comprising a back central portion connecting the hub to the back outer rim; and the wheel assembly comprising at least one fastener for securing the weigh in the socket on the main body of the wheel. In one variation of the wheel assembly, the socket or the weight is configured with the stop to prevent the weight from moving in an axial direction toward the back face of the wheel. In another variation, the socket is configured with the stop to prevent the weight from moving in an axial direction toward the front face of the wheel.

In one variation as used herein, the fastener may comprise of screws, O-rings, clips, spring loaded clips, brackets, magnets, etc. In another variation, the weight may further comprise the "fastener" or may itself be fastened, wherein the weight may be threaded and screwed into the socket having matching threads. In one aspect of the wheel assembly, the socket comprises of at least one, two, three, four, five or six sockets for receiving a plurality of weights, and wherein the weights are secured in the sockets with at least one fastener. In another variation, the wheel assembly comprises seven, eight, nine, ten or more sockets. In a particular embodiment, the socket is a concentric socket adapted to retain a weight. The weight may comprise of one or more weights that may be inserted in the socket, and the weight may be configured in the similar or different shape, dimension and configuration as the socket. In a particular embodiment, the fastener is an O-ring coupled to the socket for securing the weight in the socket. In another aspect, the fastener is a threaded fastener. In one variation of the above, the fastener further comprises a retaining member coupled to the fastener for retaining the weight in the socket. In another aspect, the retaining member is a substantially coaxial annular member, square member or rectangular member where at least a portion of the retaining member overlaps with the socket opening to retain the weight. In another aspect, the wheel assembly comprises at least one fastener for retaining the weight in the socket. In yet another aspect, the fastener is a spring loaded retainer that retains the weight in the socket. In a particular aspect of the above, the fastener comprises a spring loaded retainer comprising an engaging element and a biasing member for retaining the weight in the socket. In another aspect, the cylindrical wall further comprises a through hole allowing air to pass through. In one variation, the through hole is coupled with an adjustable air release valve for regulating the flow of air through the through hole. In another aspect, the fastener comprises a quick-change threaded faster coupled with a retainer member for retaining the weight in the socket. In one variation, the cylindrical wall is concave. In a particular variation, the main body comprises a first portion and a second portion configured to provide a variable width of the main body, wherein the first and second portion is configured with one or more removable spacers between the first portion and the second portion for adjusting the width of the main body.

In another embodiment, there is provided a wheel assembly comprising: a wheel comprising a main body, a substantially cylindrical wall, a front hub face comprising a central is portion connecting a hub to an outer rim, wherein the front hub face comprises a plurality of sockets for receiving a plurality of removable weights, a back face comprising a back central portion connecting the hub to the back outer rim, wherein the back face further comprising a stop for preventing the weights from moving in an axial direction toward the back face of the wheel; the rim comprising a front bead lock fastened to the front hub face of the main body of the wheel for securing the inside edge of a tire to the rim, and a back bead lock fastened to the back face of the main body for securing the inside edge of the tire to the rim; the wheel assembly comprising at least one fastener for securing the weighs in the sockets on the main body of the wheel, and further comprising a central insert comprising a central opening and configured to be axially adjustable and secured with the central opening of the wheel. In a particular embodiment, the central insert is configured with complementary thread on the central opening of the wheel and adjustable to move the central insert in a variable axial position. In one variation, the central insert is coupled to the hub with a plurality of adjustable threaded fasteners for adjusting and changing the distance between the front wheels or the distance between the back wheels.

In another embodiment, there is provided a method for maintaining stability of a vehicle for traversing off road terrain, the method comprising the lowering of the central gravity of the vehicle by incorporating a wheel assembly comprising a front hub face comprising a plurality of sockets for receiving a plurality of removable weights. In one variation of the method, the wheel assembly comprises: a wheel comprising a main body, a substantially cylindrical wall, a front hub face comprising a central portion connecting a hub to an outer rim, wherein the front hub face comprises a plurality of sockets for receiving a plurality of removable weights, a back face comprising a back central portion connecting the hub to the back outer rim, wherein the back face further comprising a stop for preventing the weights from moving in an axial direction toward the back face of the wheel; the rim comprising a front bead lock fastened to the front hub face of the main body of the wheel for securing the inside edge of a tire to the rim, and a back bead lock fastened to the back face of the main body for securing the inside edge of the tire to the rim; and the wheel assembly comprising at least one fastener for securing the weighs in the sockets on the main body of the wheel.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 is an exploded view of a weighted rim according to an exemplary embodiment.

FIG. 4 is a front view of the weighted rim of FIG. 3 with one of the removable weights and the associated retainers removed.

FIG. 5 is a side view of the weighted rim of FIG. 3.

FIG. 6 is a cross-section of the weighted rim of FIG. 5 taken along line 7-7 showing a retention system for a weight according to an exemplary embodiment.

FIG. 7 is a detailed cross-section of the weighted rim of FIG. 7.

FIG. 8 is a cross section of the weighted rim of FIG. 5 taken along line 9-9 showing the interaction of a retention system with a weight according to an exemplary embodiment.

DETAILED DESCRIPTION OF THE PREFERRED EMBODIMENTS

Figure 1:
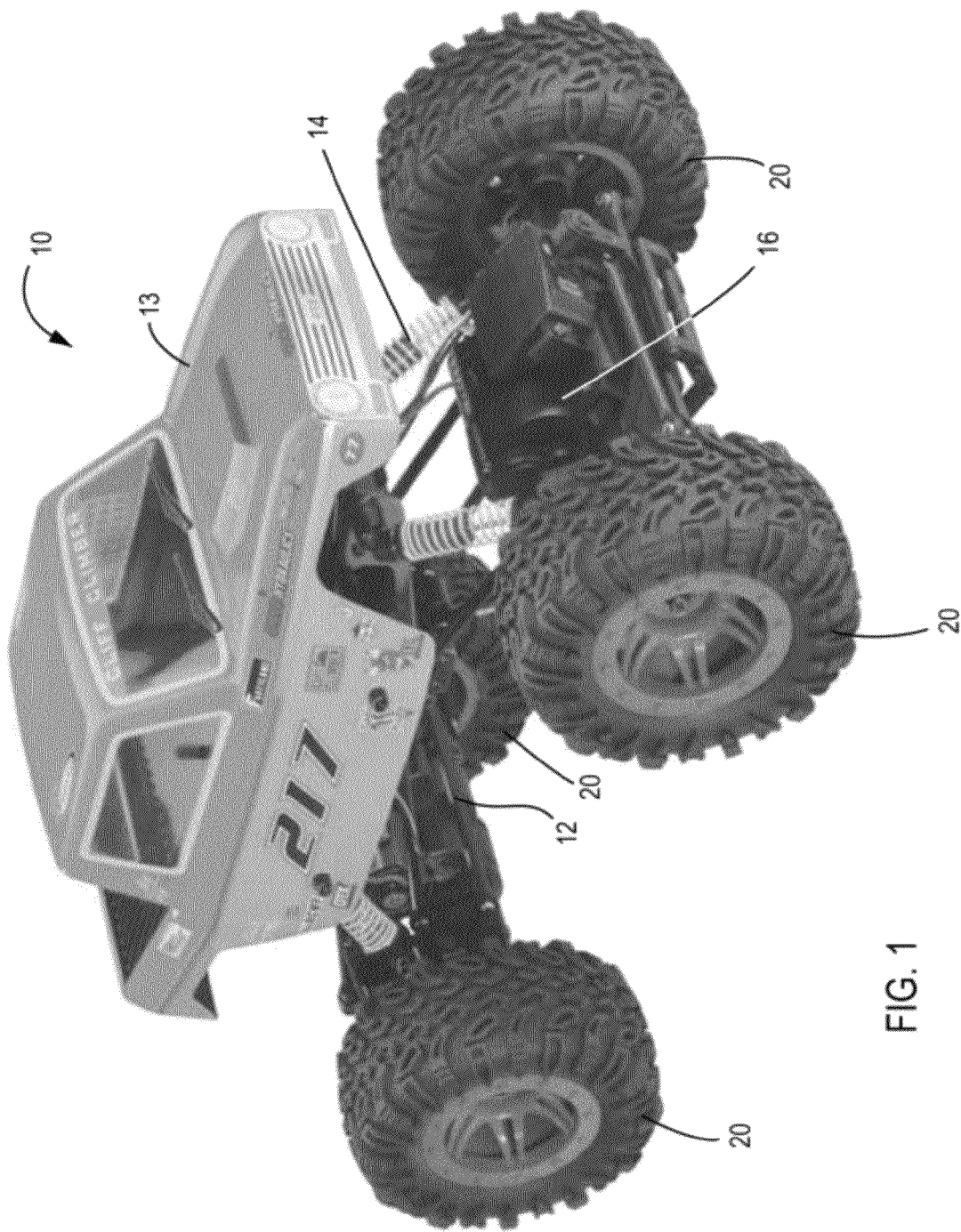
FIG. 1 is an isometric view of a radio-controlled vehicle.

The invention is described in more detail hereinafter with reference to exemplary embodiments. In the figures, for the sake of clarity, the same reference numerals are used for similar components in different embodiments.

Referring to FIG. 1, a radio controlled model vehicle 10 is shown according to an exemplary embodiment. The vehicle 10 is configured to be controlled via radio waves from a handheld controller. The vehicle 10 preferably comprises a substantially chassis or frame 12. An aerodynamically shaped shell or body 13. The body 13 may include a multitude of vehicular detailing. The detailing may be three dimensional merely surface ornamentation or indicia. Such detailing may be functional or may simply simulate similar functional elements on larger vehicles.

The frame 12 is coupled to a multitude of wheels 20 (generally four) with a suspension 14. According to one embodiment, each of the wheels 20 has a suspension 14. One or more motors 16 provide power to the vehicle 10 and turn the wheels 20. Each wheel 20 or pair of wheels 20 (e.g., the pair of front wheels and the pair of rear wheels) may also be coupled to a steering assembly 18. By provided the wheels 20 for the vehicle 10 with a suspension 14 and/or steering assembly 18, the vehicle 10 is better able to maneuver the wheels 20 and traverse over relatively rough terrain.

Figure 2:
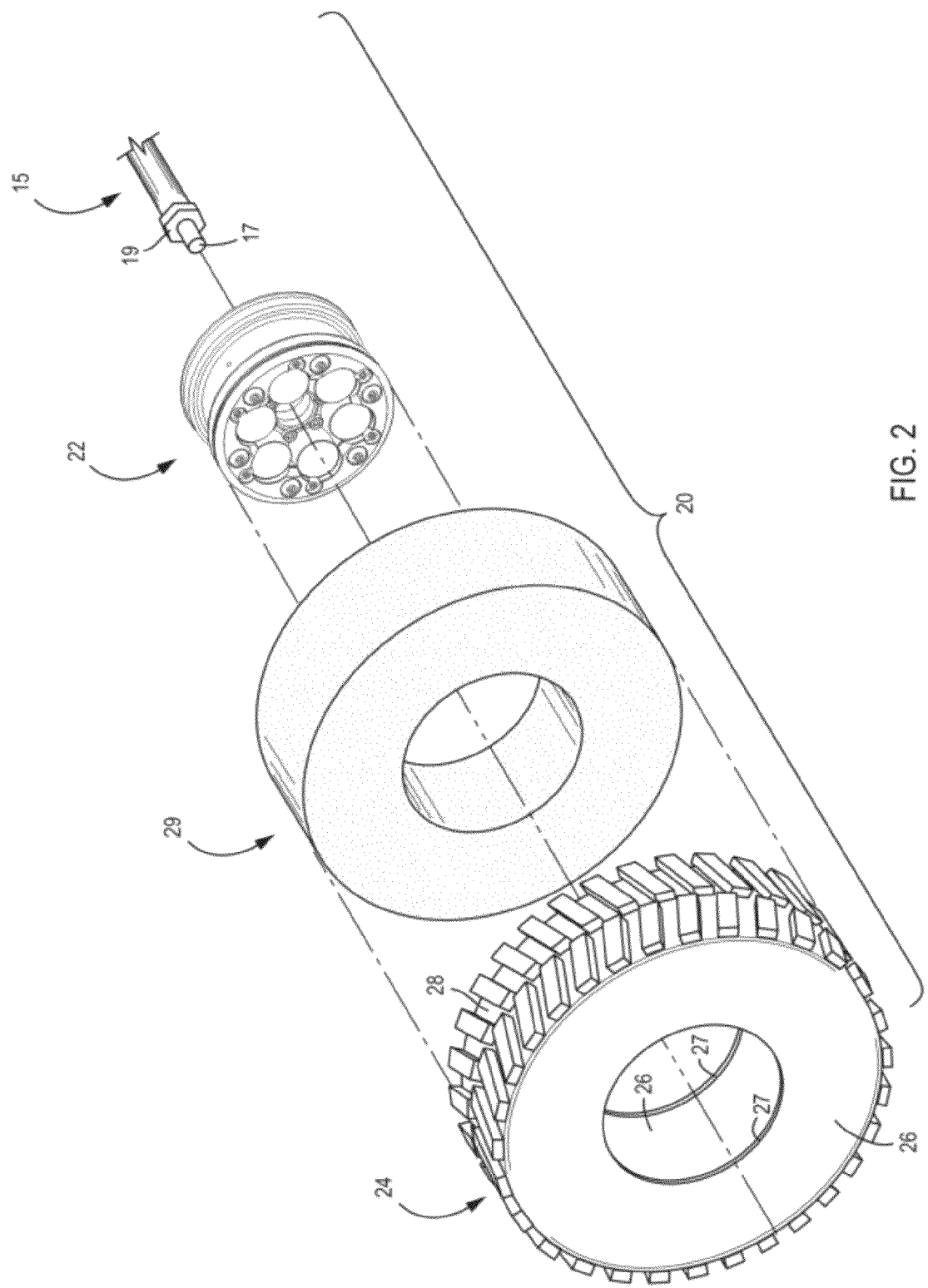
FIG. 2 is an exploded view of a tire assembly including a foam insert and an adjustable weighted vehicle wheel assembly according to an exemplary embodiment.

Referring now to FIG. 2, a wheel 20 for an RC vehicle 10 is shown according to an exemplary embodiment. The wheel 20 comprises a rim 22 that receives a tire 24. The rim 22 is formed from a relatively rigid material such as a metal (e.g., aluminum, brass, steel, etc.) or a polymer (e.g., nylon). The wheel 20 is coupled to the axle that is driven by the motor 16. The tire 24 is formed from a resilient material such as rubber and is coupled to the rim 22. According to various exemplary embodiments, the tire 24 may be affixed to the rim 22 with an adhesive, with a mechanical connection (e.g., by being trapped between two portions of the rim), or any other suitable fastening method known in the art.

The tire 24 includes an annular side wall 26 that is coupled to the rim 22 and a tread 28 that is configured to contact the surface upon which the vehicle 10 is driven. The tire 24 is configured to flex and deform so that the tread 28 can better conform to the surface upon which the vehicle 10 is driven. However, unlike tires on larger vehicles, the tires 24 on most vehicles, such as an RC model vehicle 10 are not filled with pressurized air. Instead, a foam support 29 is provided within the tire 24, between the tire 24 and the rim 22. The foam support 29 is a is compressible body that allows the tire 24 to deform but prevents excessive deformation such as "bottoming out" such that the rim 22 may come within close proximity of contacting the driving surface. According to one embodiment, the foam support 29 is formed from a closed-cell foam such as a urethane foam.

Referring now to FIGS. 3-7, a rim 22 is shown according to an exemplary embodiment that is configured to receive a plurality of weights 50 to selectively increase the mass of the wheel 20 and lower the center of gravity of the vehicle. The rim 22 comprises a main body 30, bead locks 40 coupled to the main body 30, removable weights 50, and a central insert 60.

The main body 30 comprises a cylindrical wall 32 surrounding a hub 34. The hub 34 includes a central opening 36 that receives the vehicle axle 15. A multitude of sockets 38 (e.g., hollows, openings, slots, cavities, bores, etc.) are provided in the hub 34 between the central opening 36 and the cylindrical wall 32. The sockets 38 receive weights 50 and reduce the mass of the rim 22 when the weights 50 are absent be reducing the amount of material comprising the hub 34.

According to an exemplary embodiment, the main body 30 is formed from a metal such as aluminum. The main body may be formed in a variety of ways, including by machining or by casting. According to other exemplary embodiments, the main body may be formed or an injection molded polymer.

Figure 10A:
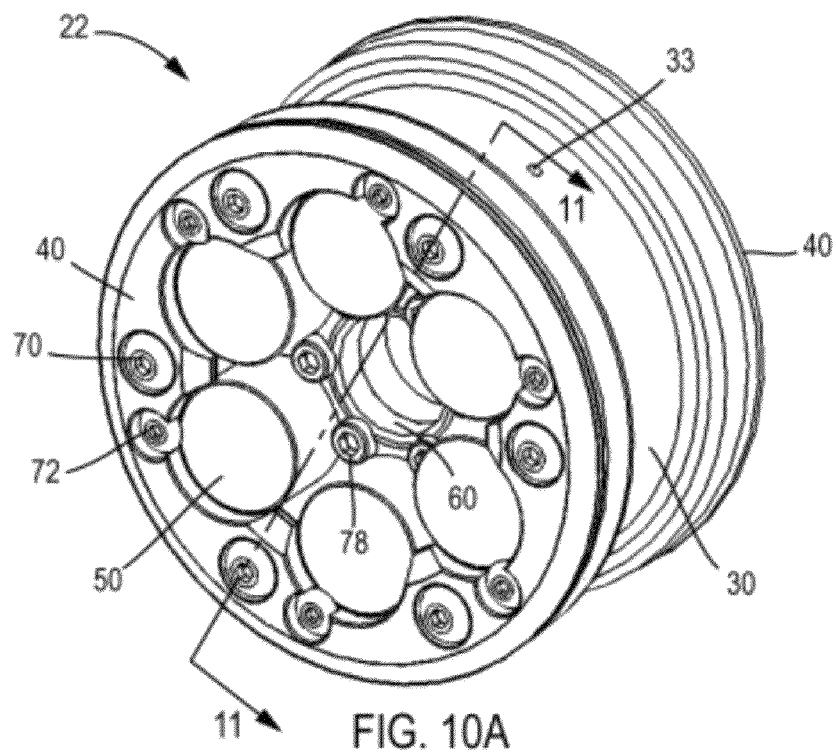
FIGS. 10A and 10B are front and rear isometric view of a weighted rim for a wheel according to an exemplary embodiment.
Figure 10B:
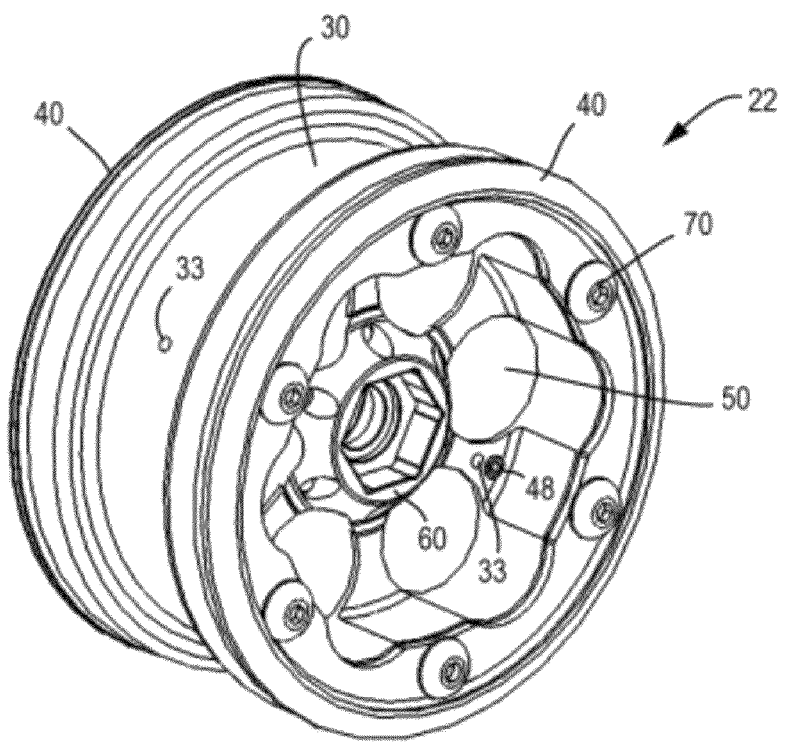
Figure 11:
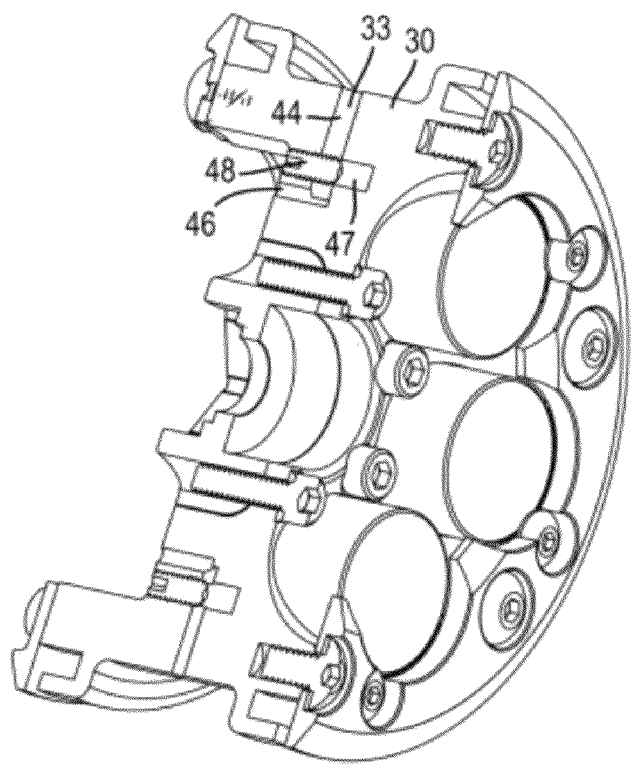
FIG. 11 is a cross-section view of the weighted rim of FIG. 10A taken along line 11-11.

As shown in FIG. 10A-11 through holes 33 may be provided through the cylindrical wall 32. Through holes 33 allow air to pass through the cylindrical wall between the outside atmosphere and the interior of the tires 24. Referring especially to FIG. 11, according to one exemplary embodiment, the through hole 33 is an L-shaped channel with a radial portion 44 and an axial portion 46. A separate threaded hole 47 intersects the through hole 33 and receives a set screw 48. The set screw 48 may be advanced into the threaded hole such that it is disposed partially in the through hole 33, partially or completely obstructing the flow of air through the through hole 33. In this way, a user may adjust the set screw 48 and control or fine tune the amount of air that is allowed to pass through the cylindrical wall between the outside atmosphere and the interior of the tires.

Bead locks 40 are coupled to either end of the main body 30, trapping the inside edges 27 (e.g., "beads") of the tire 24 in a groove 42 formed between the bead locks 40 and the main body 30. The bead locks 40 are generally annular bodies that are aligned with the cylindrical outer portion of the main body 30 without obscuring or covering the hub 34. According to an exemplary embodiment, the bead locks are each coupled to the main body 30 with fasteners, such as socket-headed threaded fasteners 70.

Weights 50 may be selectively inserted and retained in the sockets 38 to increase the mass of the wheel 20 and lower the center of gravity of the vehicle. By lowering the center of gravity, the stability of the vehicle 10 is increased and the severity of the slope (i.e., slopes approaching vertical) may be overcome by the vehicle 10. In one particular embodiment, six weights 50 may be inserted into six corresponding sockets 38 provided symmetrically about the hub 34. To keep the wheel 20 balanced, two, three, four or six weights 50 may be added symmetrically to the rim 22. For example, if two weights 50 are used, they are inserted to sockets 38 opposite of each other. By allowing a different amount of weights 50 to be added to the rim 22, a user may fine tune the mass of the wheel 20.

In one embodiment, the weights 50 are inserted into the sockets 38 from one side of the rim 22 (e.g., the outboard side of the rim 22). The weights 50 may be inserted into the main body 30 before the wheels 20 are coupled to the vehicle axle 15 or after the wheels 20 are mounted. The movement of the weights 50 in the axial direction is limited by a stop, such as a ledge 39 (e.g., protrusion, rim, lip, etc.) extending inward from the side walls of the socket 38. The weights 50 are held in place by retainers, shown in FIG. 3 as threaded fasteners 72. The threaded fasteners 72 engage threaded openings 74 in the hub 34 proximate to the sockets 38 such that the heads of the fasteners 72 overlap the sockets 38 on either side of the threaded opening 74 and restrict the movement of a weight 50 inserted into the socket 38. Therefore, each fastener 72 helps to retain weights 50 in two sockets 38 and each weight 50 is retained by two fasteners 72. In this way, a missing fastener 72 that is lost (i.e. due to insufficient tightening) or simply not coupled to the hub 34 does not allow any weights 50 to fall or be shaken loose from a socket 38. Rather, up to three fasteners 72, provided they are in alternating openings 74, may be absent while still retaining all the weights 50.

According to other exemplary embodiments, each fastener 72 may only retain one weight 50, as shown in FIGS. 10A and 10B. According to other exemplary embodiments, an annular retaining member similar to the bead locks 40 and concentric with the bead locks 40 may be coupled to the hub 34 (e.g., with a screw) such that it overlaps the sockets 38 and retains the weights 50 in the sockets 38. According to still other exemplary embodiments, the outboard bead lock 40 may extend inward such that it overlaps the sockets 38 and retains the weights 50 in the sockets 38.

According to yet another exemplary embodiment, referring to FIGS. 5-8, a spring-loaded retainer 80 may be provided to retain the weights 50 in the sockets. As shown best in FIGS. 7-8, the retainer 80 comprises an engaging element, such as a ball bearing 82 and a biasing member, shown as a coil spring 84. The ball bearing 82 and the spring 84 are housed in shaft or bore 86 that extend from the outer cylindrical wall 32 of the main body to one of the sockets 38 formed in the hub 34. The end of the bore 86 proximate to the socket 38 is chamfered or otherwise shaped such that the opening 87 in the socket 38 has a diameter that is smaller than the diameter of the bore 86. The bore 86 is at least partially threaded and receives a correspondingly threaded member such as a set screw 88. The spring 84 is compressed between the set screw 88 and the ball bearing 82. The spring 84 biases the ball bearing 82 towards the socket 38 and extends partially through the opening 87. Because the ball bearing 82 has a diameter that is larger than the diameter of the opening 87, only a portion of the ball bearing 82 is allowed to extend into the socket 38 while the ball bearing 82 is still retained in the bore 86.

The weight 50 received in the socket 38 includes a groove 76 (e.g., notch, channel, trough, concavity, slot, etc.) that is generally aligned with the opening 87 and the ball bearing 82. When the weight 50 is inserted into the socket 38, the ball 82 is pushed out of the socket 38. Once the weight 50 is fully seated (e.g., contacting the ledge 39), the groove 76 is aligned with the opening 87 and the ball bearing 82 is biased back out through the opening 87 by the spring 84. The ball 82 engages the groove 76 to retain the weight 50 in the socket 38.

According to an exemplary embodiment, the weights 50 are cylindrical bodies formed of a metal. The weights 50 may be formed from a variety of metals or alloys including, but not limited to, such as aluminum, steel, brass, tungsten, or lead. A user may use several different is sets of weights 50 of different materials to add a desired amount of mass to the rim 22. For instance, weights of a relatively dense material such as lead may be used to increase the mass of the rim more than weights of a less dense material such as aluminum. According to other exemplary embodiments, a user may mix weights formed of different materials. For example, a user may use weights of two different materials in alternating sockets to add a mass that is in between the mass that would be added with all weights of either of the materials.

Referring now especially to FIGS. 3, 9A, 9B and 9C, an insert 60 is coupled to the hub 34 proximate to the central opening 36. According to an exemplary embodiment, the insert is coupled to the hub 34 with removable threaded fasteners 78. The insert 60 includes a central opening 62 (e.g., hollow, bore, recess, etc.) and a socket 64 that are each aligned with the central opening 36 in the hub 34 and are separated by an inwardly extending ledge 66 (e.g., lip, protrusion, etc.). When the wheel 20 is coupled to the axle 15, the insert 60 receives a coupler 19 to rotationally lock the wheel 20 to the axle 15. A threaded end 17 of the axle 15 extends through the central openings 36 and 62. A fastener such as a nut (not shown) is threaded onto the threaded end 17 until it is seated on the ledge 66 to axially couple the wheel 20 to the axle 15.

Figure 9A:
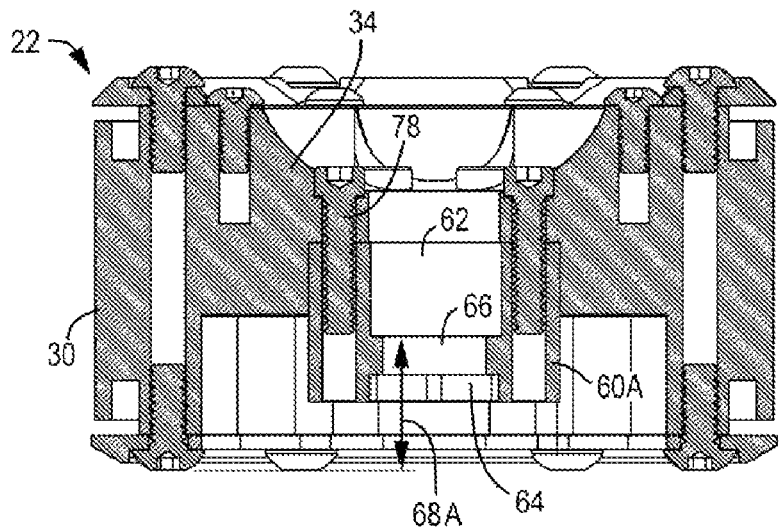
FIGS. 9A-9C are cross-section views taken along line 10-10 showing a hex core insert coupled to the rim according to several different embodiments to adjust the distance between wheels.
Figure 9B:
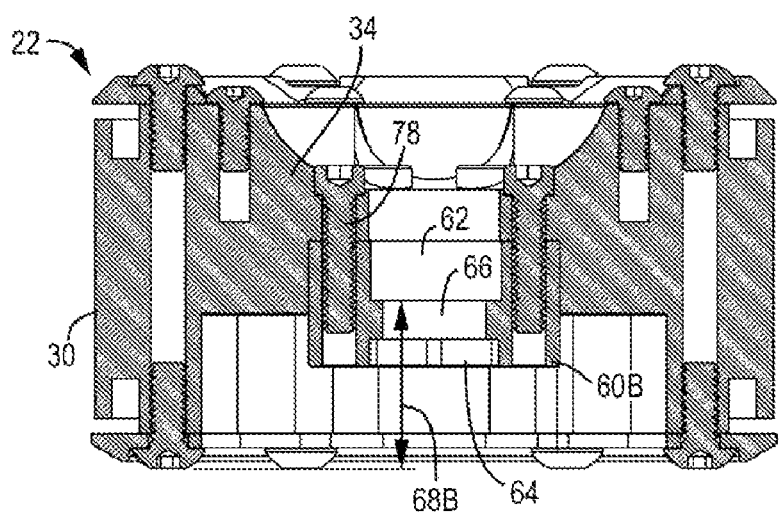
Figure 9C:
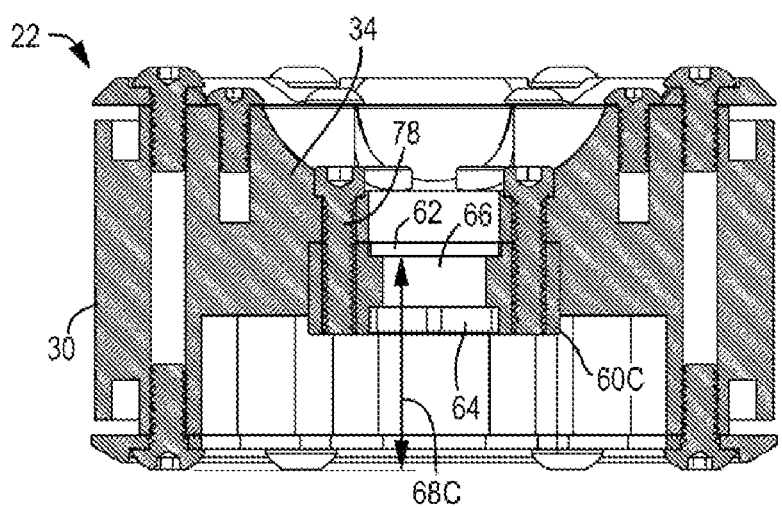

The distance between the two wheels 20 on the axle 15 may be adjusted by changing the relative distance between the ledge 66 and the rear of the main body 30 of the rim 22. To this end, different inserts 60 may be provided to change the width of vehicle 10 (e.g., the distance between the front wheels 20 or between the rear wheels 20). With a relatively deep insert 60 (FIG. 9A) the distance 68A between the ledge 66 and the rear of the main body 30 is shorter than the distance 68C between the ledge 66 of a relatively shallow insert 60 and the rear of the main body 30 (FIG. 9C). An insert 60 of an intermediate depth has an intermediate distance 68A between the ledge 66 and the rear of the main body 30. According to an exemplary embodiment, using deep inserts 60 (FIG. 9A) instead of a shallow inserts 60 (FIG. 9C) increases the wheel-to-wheel width of the vehicle by approximately 0.5 inches. Such a flexibility in wheel-to-wheel width is desirable in competitions involving rock crawling vehicles 10 where a wider distance between the front wheels 20 is desirable for increased stability, while a narrower distance between rear wheels 20 is desirable for increased maneuverability around markers and obstacles.

While the weights 50 are shown in the figures as cylindrical bodies, according to other exemplary embodiments, the weights may be a wide variety of other shapes (i.e., prismatic, cubic, spherical, bullet-shaped, etc.). The weights may be solid, as shown in the figures, or may be at least partially hollow.

The main body 30 may be configured to have a variable width. Reducing the width of the main body 30 in turn reduces the space between the beads 27 of the tire 24. This creates a bulge on the side walls 26. Narrowing the rim 22 may allow the vehicle 10 to have better traction. Narrowing the rims 22 also pulls the inside of the tires 24 inward, allowing more turning while avoiding the suspensions links.

Figure 12:
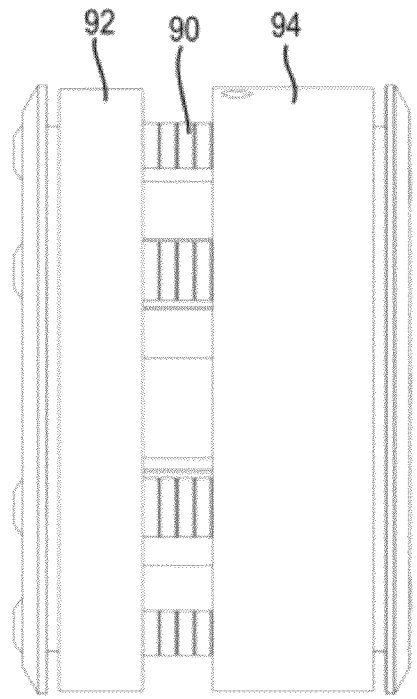
FIG. 12 is a side view of an adjustable width rim according to an exemplary embodiment.
Figure 13:
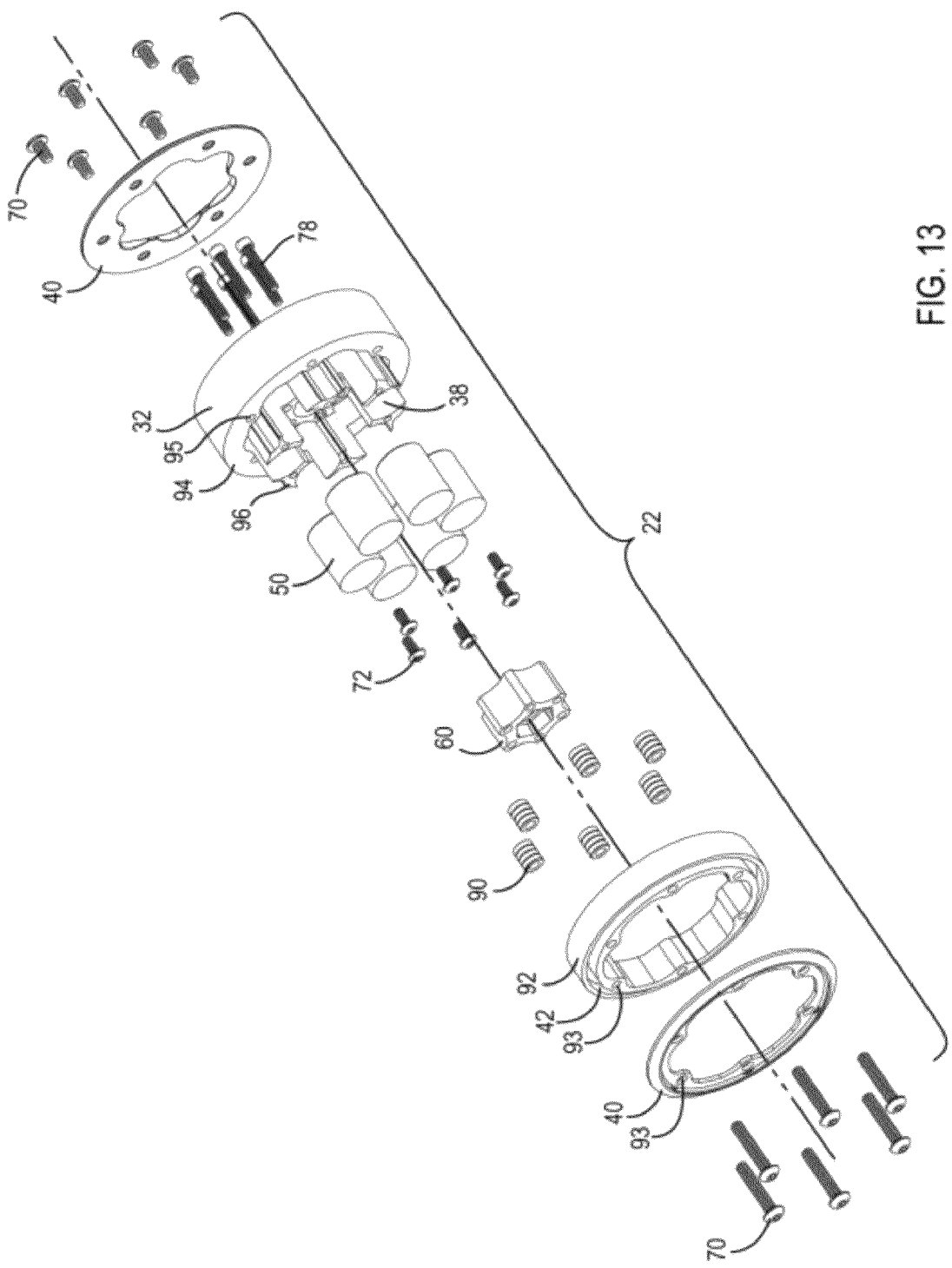
FIG. 13 is an exploded isometric view of the adjustable width rim of FIG. 12.

According to one exemplary embodiment, shown in FIGS. 12-13, the main body 30 comprises a first portion 92 and a second portion 94. One or more removable spacers 90 are provided between the first portion 92 and the second portion 94 to vary the overall width of the rim 22. As shown, the spacers 90 may be individual washer-shaped bodies that are provided concentrically with fasteners 70 to couple one of the bead locks 40 to the second portion 94 of the main body. The fasteners 70 pass through openings 93 in the bead lock 40 and first portion 92 of the main body and through the removable spacers 90 to engage threaded holes 95 in the second portion 94. The second portion 94 includes a series of bosses 96 (e.g., projections, etc.) that form sockets 38 for the removable weights 50 and locate the spacers 90. The first portion 92 interlocks with the bosses 96 to prevent rotation of the first portion relative 92 to the second portion 94. Preventing rotation of the first portion relative 92 to the second portion 94 avoids applying a damaging torque the tire 24.

While FIGS. 12-13 show a rim with a series of six stacks of cylindrical spacers, with each stack including four spacers, it should be appreciated that many variations are possible. For instance, instead of separate stacks of spacers, the spacers could be annular members similar in shape to the first portion 92 of the main body or the bead locks 40. According to still other exemplary embodiments, more or fewer spacers of varying thicknesses may be provided to allow a user to achieve a wide range of rim widths.

As utilized herein, the terms "approximately," "about," "substantially", and similar terms are intended to have a broad meaning in harmony with the common and accepted usage by those of ordinary skill in the art to which the subject matter of this disclosure pertains. It should be is understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the accompanying drawings. It should be noted that the orientation of various elements may differ according to other exemplary embodiments, and that such variations are intended to be encompassed by the present disclosure.

It is important to note that the construction and arrangement of the wheel assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A wheel assembly for a vehicle comprising:
a wheel comprising a main body having a first portion and a second portion, a substantially cylindrical wall, a front hub face and a back hub face comprising a central portion connecting a hub to an outer rim;
the back hub face comprising a back central portion connecting the hub to the back outer rim;
wherein the main body is configured to provide a variable width of the main body or a variable width of the rim; and
wherein one or more removable spacers are provided in the space between the first portion and the second portion of the main body to vary the overall width of the main body or the width of the rim and wherein the spacers are individual washer-shaped bodies that are provided concentrically with fasteners, and wherein the washer-shaped bodies and fasteners couple a bead lock comprising openings, to the second portion of the main body.

2. The wheel assembly of claim 1, wherein the main body comprises a first portion and a second portion having a space between the first portion and the second portion, and wherein the amount of space between the first portion and the second portion of the main body determines the width of the main body or the width of the rim.

3. The wheel assembly of claim 2, wherein the fasteners pass through the openings and the first portion of the main body and through the removable spacers to engage threaded holes in the second portion.

4. The wheel assembly of claim 1, wherein an insert is coupled to the hub with removable fasteners.

5. The wheel assembly of claim 4, wherein the wheel assembly is configured for the use of a deep insert instead of a shallow insert that increases the wheel-to-wheel width of the vehicle by approximately 0.5 inches.

* * * * *